United States Patent [19]

Baltazar

[11] Patent Number: 5,750,927
[45] Date of Patent: May 12, 1998

[54] FIRE PROTECTION ARRANGEMENT FOR TEMPERATURE-SENSITIVE, HEAT-PRODUCING ARTICLE

[76] Inventor: Osni Baltazar, 1038 Liberty St., El Cerrito, Calif. 94530

[21] Appl. No.: 289,896

[22] Filed: Aug. 12, 1994

[51] Int. Cl.$^6$ .................................................. H02G 3/04
[52] U.S. Cl. .............................. 174/68.3; 174/48; 52/232; 169/48
[58] Field of Search .................... 174/68.3, 99 R, 174/48, 121 A; 138/123, 124, 125; 52/232; 169/45, 48

[56] References Cited

U.S. PATENT DOCUMENTS

| | | | |
|---|---|---|---|
| 3,022,190 | 1/1962 | Feldman | 165/1 |
| 3,513,114 | 5/1970 | Hann et al. | 523/179 |
| 3,849,178 | 11/1974 | Feldman | 428/446 |
| 3,929,167 | 12/1975 | Bickel | 174/68.3 X |
| 4,052,526 | 10/1977 | Pratt et al. | 428/447 |
| 4,064,359 | 12/1977 | Peterson et al. | 174/68.3 X |
| 4,216,259 | 8/1980 | Groth | 428/216 |
| 4,223,175 | 9/1980 | Crew et al. | 174/48 X |
| 4,276,332 | 6/1981 | Castle | 174/68.3 X |
| 4,493,945 | 1/1985 | Feldman | 174/68.3 |
| 4,529,467 | 7/1985 | Ward et al. | 156/307.3 |
| 4,584,214 | 4/1986 | Eierman | 174/99 R X |
| 4,743,625 | 5/1988 | Vass et al. | 521/122 |

Primary Examiner—Hyung S. Sough

[57] ABSTRACT

A temperature-sensitive, heat-producing article, such as an electric cable, is fire protected by a multi-layered, thin, light weight, and vented arrangement with enhanced low-temperature heat dissipation during normal operation and effective high-temperature heat blocking during a fire. It includes a. an inner layer of heat blocking material chosen from the class of reactive endothermic materials (14), b. a vented, thin, multilayered heat screen (10), c. a gap producing spacer (12), and d. in combination, enhanced conductive, convective, and radiating elements for heat dissipation at low temperatures (11, 12, 41, and 44). The screen (10) includes a plurality of alternating layers of porous, ultra-thin, high-temperature, non-wicking insulating fiber cloths, and high-temperature heat-reflecting metallic porous foils with a layer of metallic wire cloth on the outside, i.e, the side facing the fire. The inner side of the screen (10) is held separated from inner layer (14) by a gap-forming crimped metallic wire cloth (12). The inner layer (14) encloses and is in contact with the protected article (18). The outermost layer, a wire cloth, is connected, through the layers of the heat screen, to the metallic spacer by a plurality of heat conducting wire segments, establishing a heat dissipation path designed to disintegrate during a fire.

35 Claims, 6 Drawing Sheets

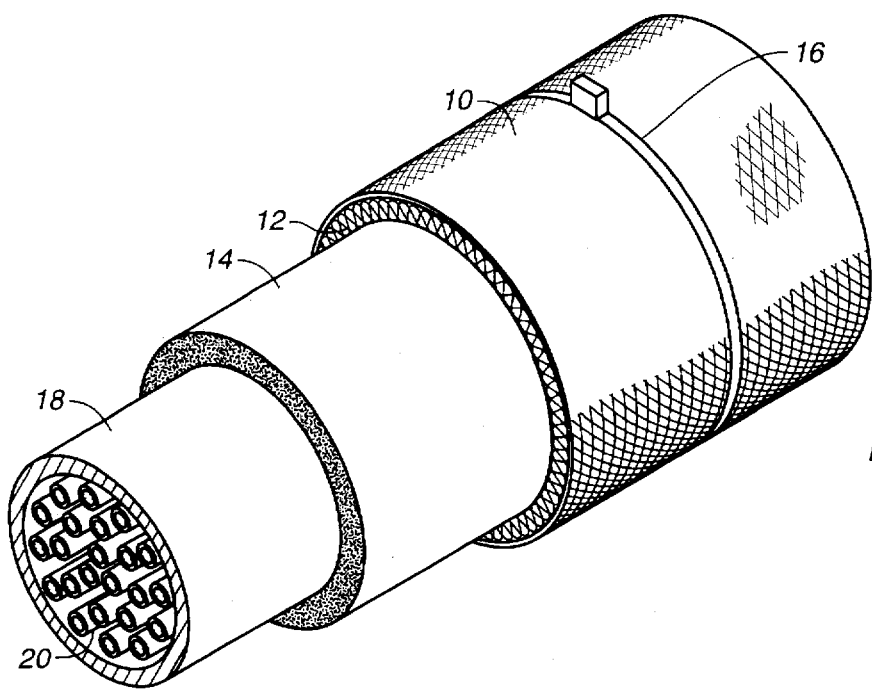
FIG._1
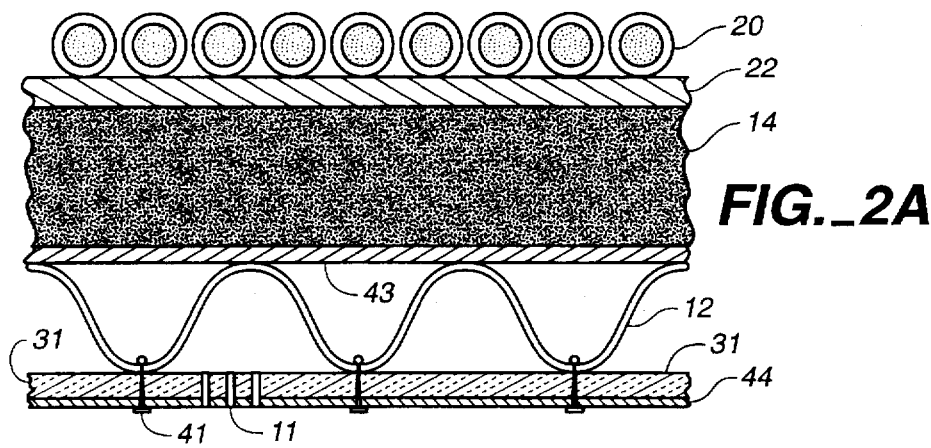
FIG._2A
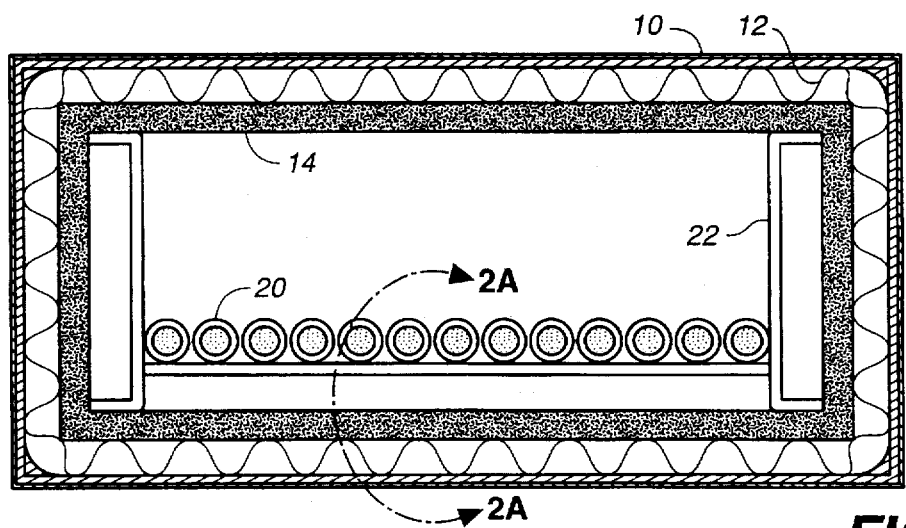
FIG._2

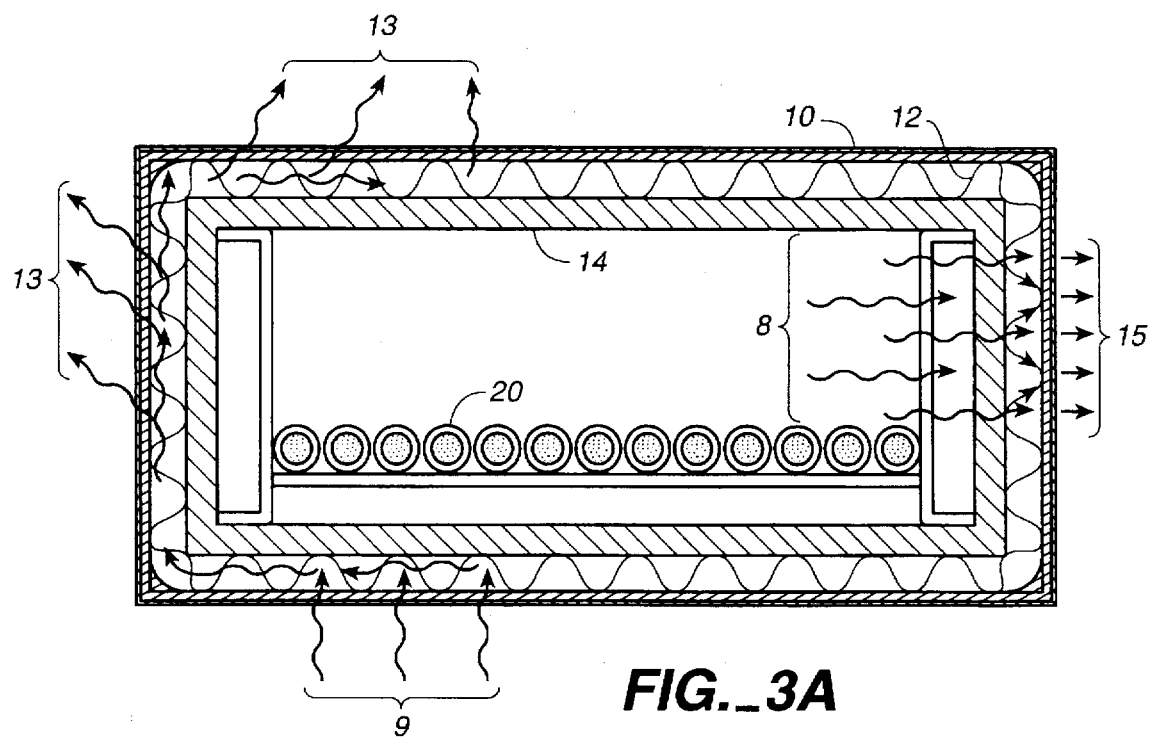
FIG._3A
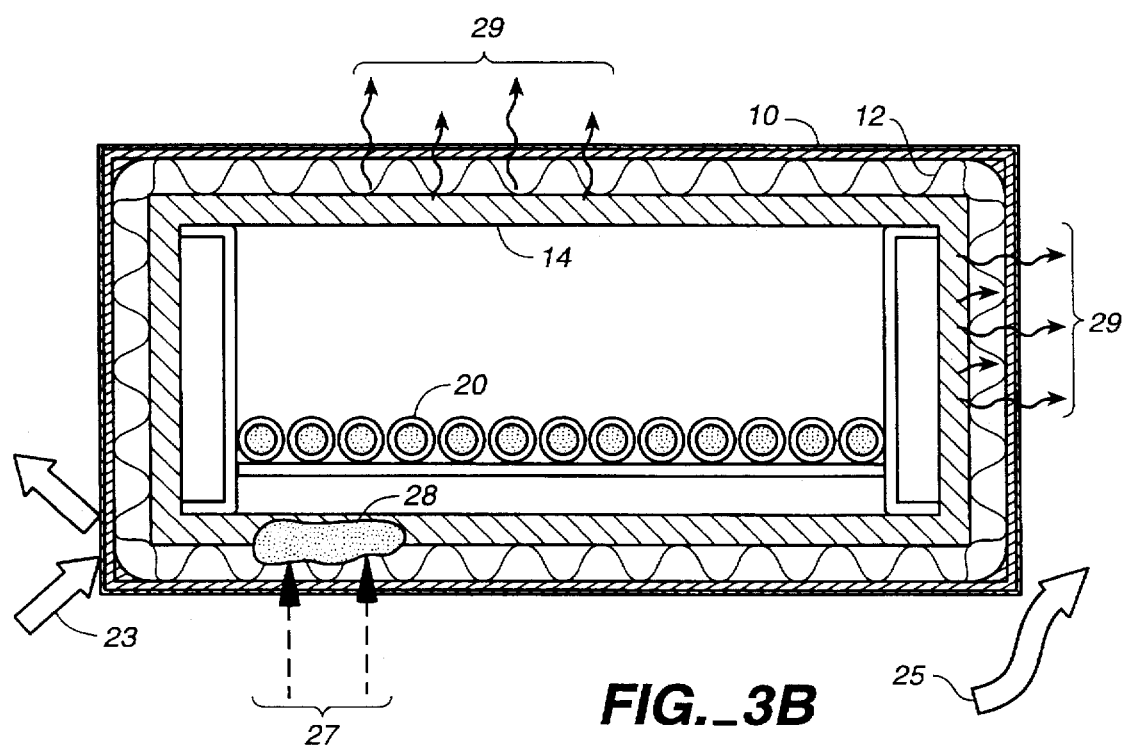
FIG._3B

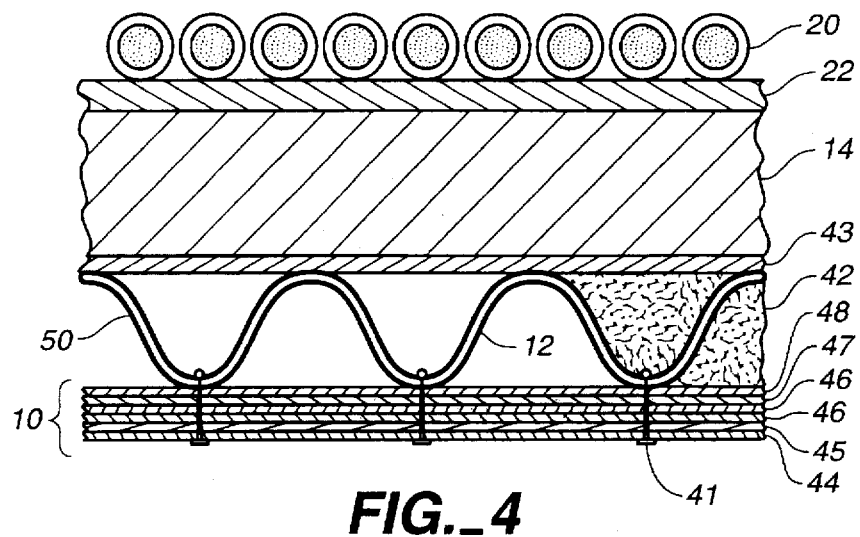
FIG._4
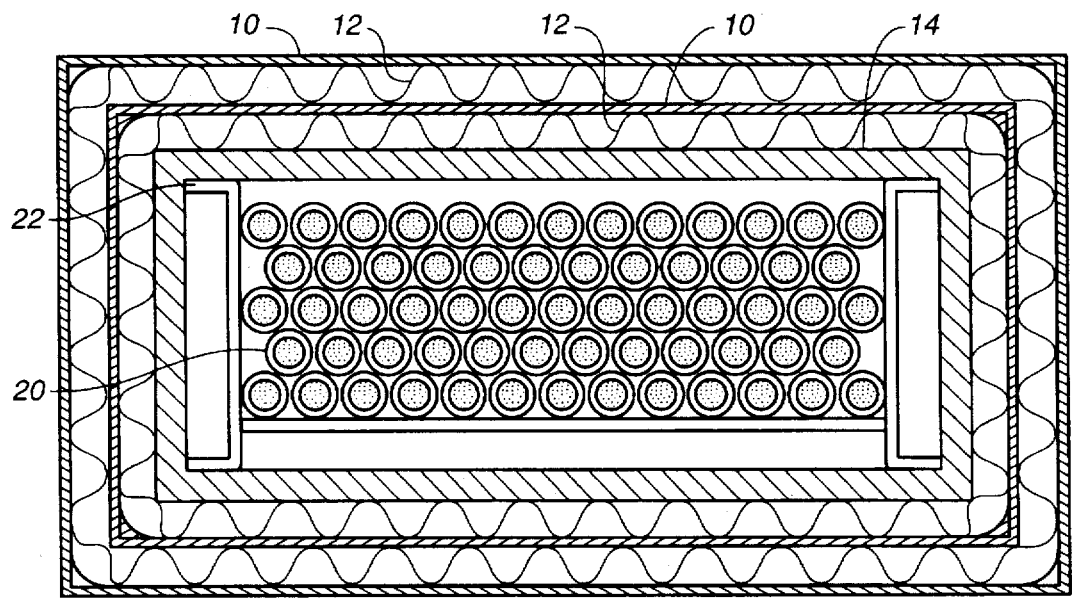
FIG._5

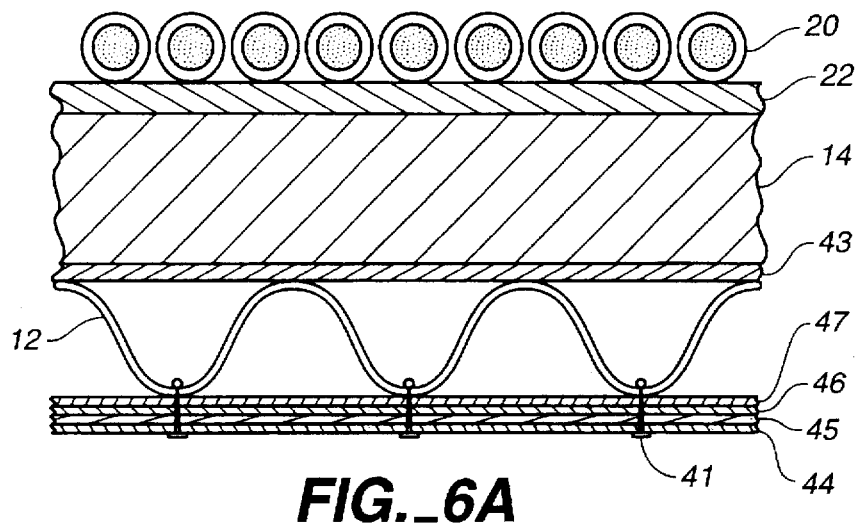
FIG._6A
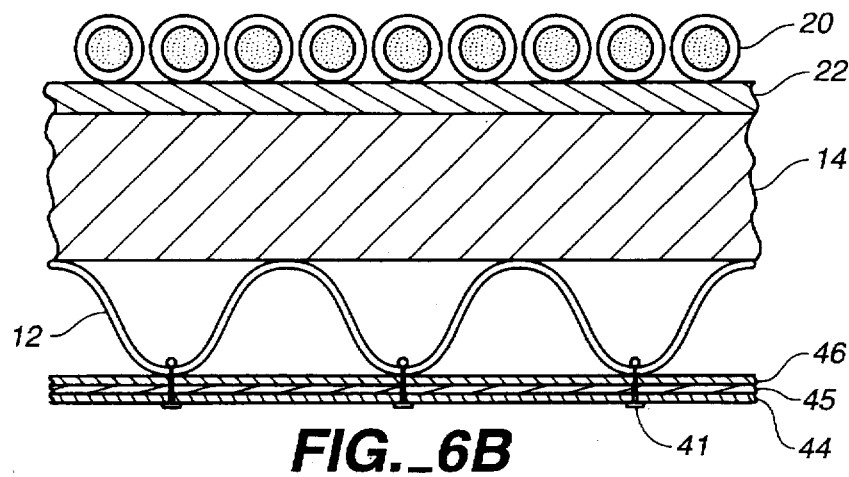
FIG._6B
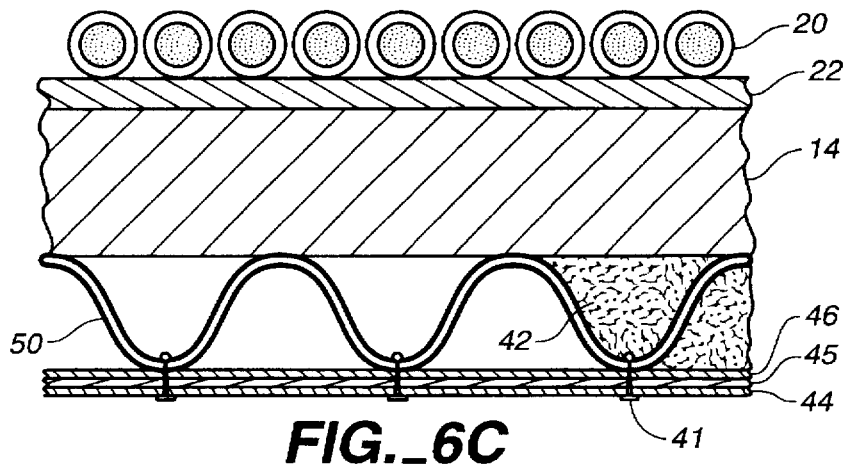
FIG._6C

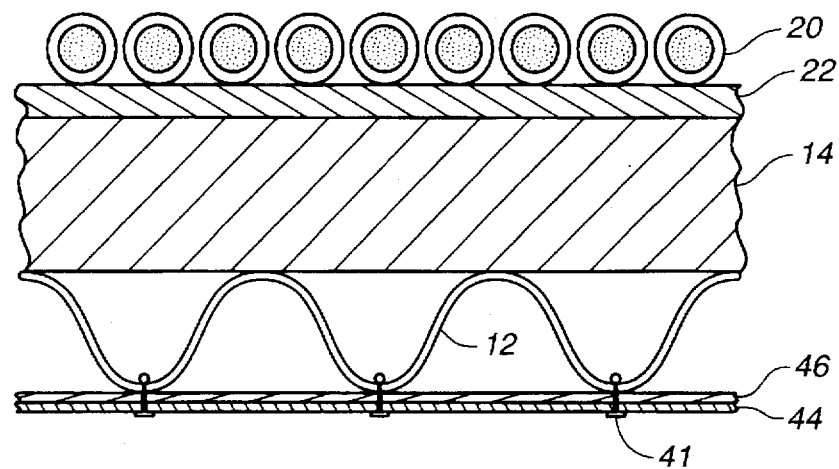
FIG._6D
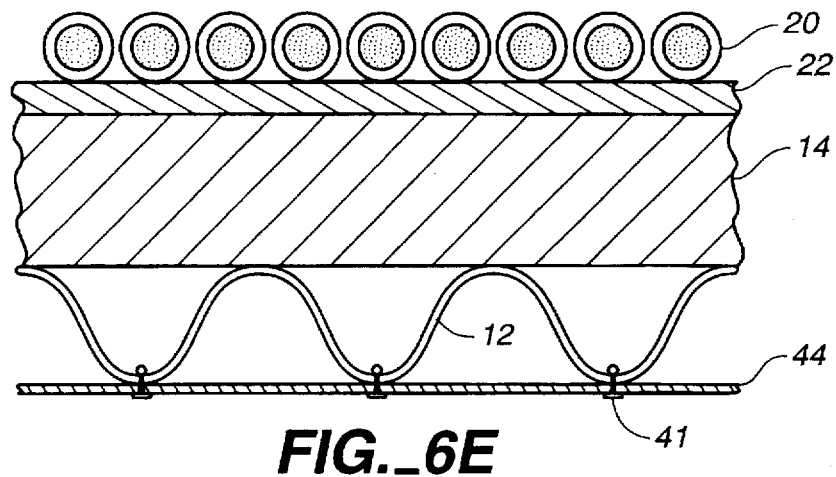
FIG._6E
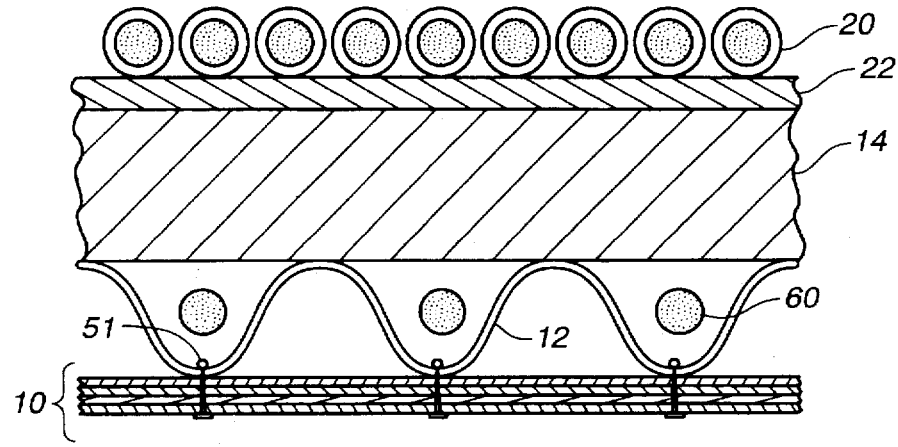
FIG._6F

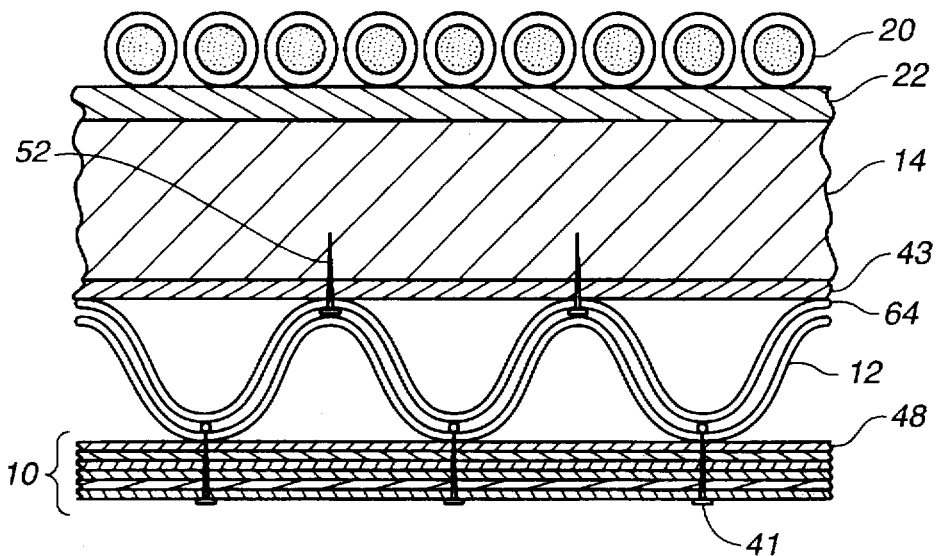
FIG._6G
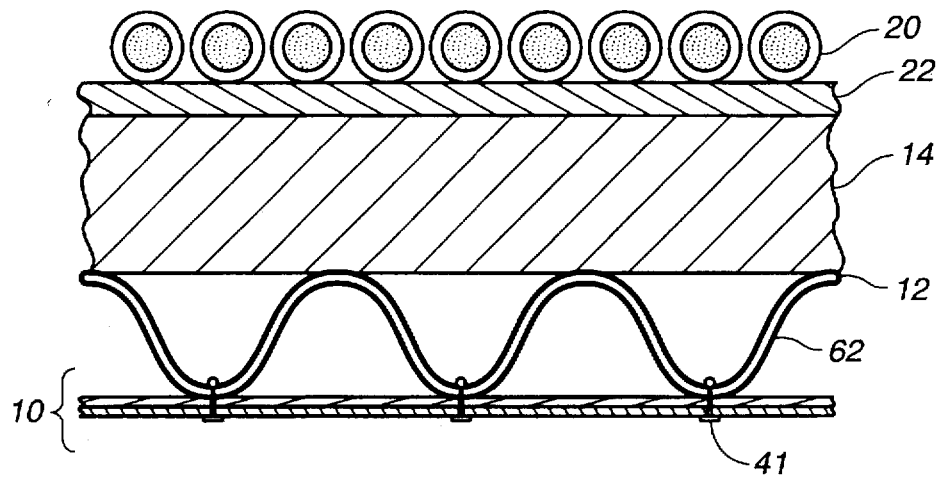
FIG._6H

FIRE PROTECTION ARRANGEMENT FOR TEMPERATURE-SENSITIVE, HEAT-PRODUCING ARTICLE

BACKGROUND

1. Field of the Invention

This invention relates to fire-protection of a temperature-sensitive article, specifically to the protection of such an article which generates heat during normal operation, such as an electric cable.

2. Prior Art

The problem of protecting electric cables in trays, in conduits, or loose in the air, against fire, is a complex one. This is because, at the same time that the protective system has to prevent heat from fire from damaging the cables, it has to allow heat generated by the cables (due to the electric current they carry during normal operation) to dissipate to the surrounding air. These requirements have limited the use of passive insulators, such as rock wool, fiber glass, etc., because these materials insulate heat from either direction at any temperature.

If a fire barrier installed around a cable prevents heat from escaping, causing the cable to run hotter than it is supposed to, there are two ways to reduce the temperature of the cable. One way is to improve the heat dissipation to the surroundings. The other is to reduce the current the cable carries, thereby reducing the generation of heat. The reduction of current is known as ampacity derating (derating the amperage capacity of the cable).

In many situations, such as those encountered in nuclear reactors, where safety-related power cables have to be protected against fire for up to three hours, it is not always possible simply to pack more and more insulating material around the cable until it passes the three-hour fire endurance test. This is because it would be necessary to derate the cables to keep the internal temperature below the accepted limit of 90° C. during normal operation. In this situation, reactive endothermic (heat absorbing) materials, such as THERMO-LAG insulation (manufactured by Thermal Science of St. Louis, Mo.) and INTERAM insulation (manufactured by 3M of St. Paul, Minn.), have been used.

These reactive endothermic materials block incoming heat from fire in a complex way that uses a combination of endothermic reactions, intumescense, ablation, dehydration, sublimation, etc.. However, even though they are not good heat conductors at low temperatures (20° C. to 100° C.), they have higher thermal conductivities than the passive insulators. Therefore they allow more heat to dissipate to the surroundings during normal operation.

Aside from the ampacity, derating problems which exist when protecting power cables in nuclear reactors, a fire-protection system for such an application must have the following characteristics: lightness in weight, thinness, ease of application in tight spaces around conduits and trays, non-toxicity, non-friability, no sensitivity to water and humidity, easy removability for maintenance of the cables, resistance to tear and physical abuses, resistance to water impingement during fire by the actions of fire fighters, resistance to seismic events, low flame propagation, low fuel contribution, low smoke development, and effectiveness for 40 years.

Since the early 1980s, THERMO-LAG insulation has been used for fire protection of electric cables in conduits, cable trays, junction boxes, etc., in nuclear reactors. According to Nuclear News Magazine, some 80 nuclear reactors use THERMO-LAG insulation to comply with 10CFR50, Appendix R (Code of Federal Regulation for fire protection of redundant safe shutdown trains for nuclear reactors). In these applications the cables (in cable trays, loose cables in the air, in conduits, in junction boxes, in instrument panels, etc.) are enclosed with a one- or three-hour fire-rated material or system.

Recently, there has been a flurry of controversy and activity concerning reports that THERMO-LAG insulation does not deliver the protection for the length of time for which it was rated for a given applied thickness. Also, reports have stated that the cables run hotter than they are supposed to during normal operation of the nuclear reactor. As a consequence, the NRC and the utilities which own reactors that use THERMO-LAG insulation are desperately looking for means of solving these problems. Only one solution seems possible, at least for the moment: upgrade the existing (installed) fire protection systems by overlaying each of them with an arrangement that is effective in dissipating heat at low temperatures and effective in blocking heat at high temperatures. This is because there is not yet an approved new system for such applications which can practically resolve the problems mentioned above, and the difficulties of removing THERMO-LAG insulation. The question, therefore, is how can the existing fire barrier be upgraded to increase the fire endurance without worsening the ampacity derating problems?

Since more THERMO-LAG insulation has been used in nuclear reactors than any other product in the applications mentioned above, it is necessary to understand how it works.

THERMO-LAG insulation is an intumescent subliming material (not simply an intumescent material) that protects temperature-sensitive articles by absorbing and blocking incoming heat in a complex way. When a predetermined temperature is reached, THERMO-LAG insulation will produce an insulating intumesced char. A solid component will sublime under fire conditions, absorbing heat and producing gas that travels through the char against the heat flux, further heating and further decomposing endothermically. The intumesced char is a low-density, porous matrix that acts as a heat insulator, and it also contains heat reflecting components. In the end, the combined effect of absorbing latent and sensible heat, insulating heat as a passive insulator, and reflecting heat back to the source, makes THERMO-LAG insulation a theoretically remarkable product.

For all the above mechanisms to work properly, certain conditions must exist, and these conditions have to be carefully studied to design an upgrading system for THERMO-LAG insulation. Some of the conditions are obvious from what has been described. For example, it needs space to intumesce, it needs an outlet to vent the gasses it produces, and it needs to remain with the char intact between the source of heat and the protected substrate.

As mentioned above, THERMO-LAG insulation is a reactive material, which means that it sacrifices itself by being consumed while protecting. The relevance of this is that the rated time for which it offers protection is proportional to the thickness (mass) that is placed between the source of heat and the protected substrate, as well as the characteristics of the fire environment to which it is subjected (the heat flux and temperature as a function of time).

Thus, the logical solution as to how to increase the fire protection of an existing THERMO-LAG insulation fire barrier is to increase the thickness of the barrier and /or decrease the severity of the fire environment it perceives. This should be done without worsening (or even improving) the ampacity derating problems.

It is not always possible to increase the thickness of THERMO-LAG insulation to improve its fire endurance. THERMO-LAG insulation has been tested for ampacity derating for many configurations and, in general, it has been determined that a one-hour barrier (a 1.25 cm (½") thick layer), requires 30% derating and a three-hour barrier, (a 2.5 cm (1") thick layer), requires 40% derating, both for installations where the cables are installed in trays.

In February 1994 the Nuclear Management and Resources Council (NUMARC) concluded a Phase One test program to evaluate the fire endurance of several installed THERMO-LAG insulation systems and upgrades to these systems. In these programs NUMARC evaluated upgrade systems consisting of overlaying existing THERMO-LAG insulation systems with several thicknesses of new THERMO-LAG insulation layers in combination with layers of structural wire mesh.

These tests showed that: i) every single existing THERMO-LAG installation (base line configurations) one- and three-hour, failed the fire endurance test, ii) upgraded large steel trays, upgraded large steel conduits, and upgraded small aluminum trays all failed the three-hour fire endurance tests, iii) upgraded large trays failed the one hour-fire endurance tests, iv) upgraded small steel conduits and upgraded small steel trays passed the three-hour fire endurance tests, and v) all upgraded conduits passed one-hour tests.

However the upgraded systems tested by NUMARC are heavy, rigid, difficult to apply, and require extensive ampacity derating for most of the circuits.

NUMARC's test report, especially the sections entitled "post test examination", contain adverse observations such as: "openings present along joints", "material removed by hose stream", and "material was not activated". From such observations, it is evident that THERMO-LAG insulation is not intumescing as it should during a fire. Therefore, it is failing to generate the insulating char and porous matrix for the reacting gases to travel against the incoming heat flux. Instead, it is producing a compact carbonaceous char.

OBJECTS AND ADVANTAGES

It is accordingly one object of this invention to provide improved fire protection for a heat producing article. Other objects are to protect such article against fire for more than three hours with a low-temperature heat-dissipating, high-temperature heat-blocking insulation with the following characteristics:

(a) it provides extended fire protection with low ampacity derating requirements;

(b) it is thin and flexible and therefore can easily be applied in tight spaces around articles;

(c) it is of light weight and therefore will not require re-dimensioning of existing supports;

(d) it is not sensitive to humidity or water and therefore will not be affected by accidental actuation of an existing sprinkler system;

(e) it is made from materials commonly used in nuclear reactors and will not adversely affect existing systems, such as promoting stress corrosion;

(f) it is non-toxic and non-friable and therefore is safe to apply and will not affect existing air filtering systems;

(g) it is resistant to physical abuse and therefore will not tear or come apart easily;

(h) it is non-combustible and therefore will not contribute fuel to fire, develop smoke, or propagate flame;

(i) it will not be affected by the action of fire fighters during a fire;

(j) it requires no curing time and contains no exotic or imported materials; every component is readily available from off-the-shelf products from many manufacturers;

(k) it can easily be applied by wrapping it around the elements to be protected and easily removed for maintenance, inspection, or to add cables and be re-applied;

(l) it is not affected by seismic events because it is flexible;

(m) it will remain effective for more than 40 years, (n) it will provide a shield which will replace the porous char matrix that THERMO-LAG insulation fails to produce, (o) it will therefore restore and improve the functionality of the system, and (p) it does not depend on any chancy formation of an intervening char to work properly, as does THERMO-LAG insulation when used alone.

DESCRIPTION OF DRAWINGS

FIG. 1 shows an electric conduit protected against fire by the fire protection arrangement of this invention.

FIG. 2 shows an electric cable tray protected against fire by the fire protection arrangement of this invention.

FIG. 2A is a detail of FIG. 2.

FIG. 3a illustrates how the fire protection arrangement of the present invention works during normal operation.

FIG. 3b illustrates how the fire protection arrangement of the present invention works during a fire.

FIG. 4 illustrates in transverse cross-section the main components of the basic arrangement of the present invention.

FIG. 5 shows in transverse cross-section a cable tray protected against fire by multiple application of the basic fire protection arrangement of the present invention.

FIG. 6a illustrates in transverse cross-section a low-ampacity, high-fire-endurance configuration of the present invention.

FIG. 6b illustrates in transverse cross-section a low-intermediate ampacity/high-intermediate fire endurance configuration of the present invention.

FIG. 6c illustrates in transverse cross-section an intermediate ampacity/intermediate fire endurance configuration of the arrangement of the present invention.

FIG. 6d illustrates in transverse cross-section an intermediate-high ampacity/intermediate-low fire endurance configuration of the present invention.

FIG. 6e illustrates in transverse cross-section a high ampacity/low fire endurance configuration of the arrangement of the present invention.

FIG. 6f to 6h show embodiments that include intumescent materials in the shield.

SUMMARY

The fire-protected, heat sensitive articles of the present invention consist of enclosed (overlapped, enveloped, wrapped, boxed or covered) electric cables loose in air, in conduits, in cable trays, in instrument panels, or in junction boxes, with a system consisting of the following: 1. A heat sink inner layer of a material such as THERMO-LAG insulation or INTERAM insulation, or the like, 2. An external layer or screen that will reduce the incoming heat fluxes from fire, 3. A spacer placed between the screen and the inner layer to create a gap to allow for the expansion of the inner layer, and allow air to circulate during normal operation by natural convection. This gap will also contribute to the blocking of incoming heat from fire. 4. A series of measures to create or enhance a Low Temperature Heat Path (LTHP).

The screen consists of a vented very thin layer of high temperature material or a combination of high temperature materials, such as stainless steel wire cloth; woven ceramic fiber cloth, such as NEXTEL brand produced by Minnesota Mining and Manufacturing Co. (3M); woven silicon dioxide fiber cloth, such as REFRASEAL brand produced by BP Chemical; perforated foils or coatings of heat-reflecting materials such as titanium dioxide, zirconium dioxide, aluminum dioxide, and magnesium dioxide; perforated foils, coatings, or sheets of heat absorbing materials such as thorium nitrate, cerium nitrate, praceodymium or neodymium or any of the endothermic reactive materials commonly used for fire protection.

The spacer consists of a three-dimensional matrix, such as a crimped knit stainless steel wire mesh.

The LTHP consists of materials for the spacer and screen chosen in a way that at low temperatures they will effectively dissipate heat to the surroundings. For example, the choice of stainless steel is dictated, among other reasons, by the fact that this material is a heat conductor, but not of a very high heat conductivity. Another measure to improve the low temperature heat dissipation is the choice of woven wire cloth and woven ceramic cloth, because they will produce a vented screen that will allow for the dissipation of heat at low temperatures by natural convection and simulate an intumesced insulating char during fire.

Besides the choice of material for the spacer and screen, the density of the three-dimentional matrix that occupies the gap is very important: too dense a spacer will interfere with the expansion of the inner layer and with natural convection.

The size of the gap is very important for the low temperature heat dissipation and high temperature heat blocking. In one embodiment, a material such as a metallic gauze sensitive to high temperatures (will disintegrate at high temperatures) is placed in the gap to improve low-temperature heat dissipation. In yet another embodiment, the spacer is connected to the wire cloth of the screen by a fusible link, that will conduct heat at low temperatures, but will desintegrate at high temperatures.

In yet another embodiment, perforated metallic foils of titanium, aluminum, magnesium, or zirconium are used as a next layer down to the stainless steel wire cloth. These foils have high thermal conductivity at low temperatures. Under fire conditions, they will quickly oxidize to produce low thermal conductivity, high heat reflective, and high temperature resistant materials.

FIG. 1—Insulated Electric Conduit—Description

A typical embodiment of an element protected by the arrangement of the present invention is illustrated in FIG. 1. The arrangement comprises a group of electric cables 20 inside a conduit 18 covered by a layer of heat sink inner layer 14 surrounded by a heat shield consisting of screen 10, spacer 12, and fastening band 16. Screen 10 is a porous thin flexible layer which will let air in and out by natural convection during normal operation and will let gasses from chemical reactions during fire escape. Screen 10 is composed of a multiplicity of layers of specialized materials, such as heat conducting materials, heat reflecting materials, heat insulating materials, heat absorbing materials, and temperature sensitive materials.

Prior to assembling screen 10 and spacer 12, inner layer 14 is assembled around conduit 18 or tray 22 which contains electric cables 20. Inner layer 14 is any existing approved fire barrier, preferably those reactive endothermic fire barriers such as INTERAM insulation, or THERMO-LAG insulation. Inner layer 14 is a high temperature heat sink that absorbs heat that passes screen 10, preventing the temperature of electric cables 20 from rising above a pre-determined limit.

Spacer 12 made from a three dimensional lattice layer, such as a knitted, crimped high-temperature wire mesh, is assembled between screen 10 and inner layer 14 to produce a gap for the expansion of the inner layer 14 during fire. Besides producing a gap, spacer 12 conducts heat during normal operation from the surface of inner layer 14. The gap produced by spacer 12 has extra functions of facilitating heat dissipation during normal operation by natural convection, providing space for extra heat conducting material.

FIG. 2 and 2A—Insulated Cable Tray—Description

FIG. 2 shows in transverse cross-section electric cables 20 inside cable tray 22 covered by heat sink inner layer 14 surrouded by the heat shield formed by spacer 12 and screen 10.

FIG. 2A is a detail of FIG. 2. It shows porosity 11, high-temperature heat blocking layer 31, heat conducting link 41, improving heat conduction contact layer 43, low-temperature heat dissipating/physical abuse protection layer 44. Heat conducting link 41 is a staple, a sttitch, or a tack, and can be made from a heat conducting material, such as stainless steel, and materials sensitive to high temperatures which will desintegrate or have their thermal conductivities reduced by oxidation under fire conditions, such as thin aluminum or magnesium wire.

FIG. 3A and 3B—Functional Representation

FIG. 3A is a schematic representation of a fire protected cable tray and shows how the fire protection arrangement of the present invention works during normal operation.

During normal operation of protected electric cables 20, the heat generated by the electrical current is conducted to the outer surface of inner layer 14. Part of this heat is dissipated to the surroundings by natural convection by the air circulating in the gap produced by spacer 12. Cold air from the surroundings 9 can get into the gap through screen 10 to replace hotter air 13 that will rise and escape from the gap to the surroundings through screen 10. Another part of heat 8 is conducted to spacer 12 in contact with the inner layer's surface, like cooling fins. Another part of the heat is radiated by the inner layer's surface to the screen and spacer facing this surface. Part of the heat transferred to the spacer will be dissipated to the circulating air in the gap, and part will be conducted from the spacer to the metallic outer face of screen 10 by conducting links 41: the stitches that connect the spacer to the screen. Heat 15 that reaches the outer surface of the screen will be dissipated to the surroundings by radiation and convection.

FIG. 3B is a schematic representation of an insulated cable tray and it shows how the fire protection arrangement of the present invention works during a fire.

During a fire, part of the incoming heat fluxes, radiant and convective, are blocked by the screen. The screen will reflect part of radiant heat 23 back to the source, and will divert part of convective hot draft 25 away from the inner layer. Screen 10 allows gases 29 produced by reactive inner layer 14 to travel against the incoming heat fluxes that penetrate the screen, further heating, decomposing endothermically, absorbing, and blocking incoming heat from fire. The action of the screen and the gap in providing a heat shield to the inner layer is such that the inner layer will experience a much less severe fire environment than it would without this shield.

The part of incoming heat 27 that is not blocked by the screen-gap shield will reach the inner layer's outer surface. At this point, it will be activated and will produce an intumesced cellular insulating char 28 that will fill the gap. This char will further improve the heat blocking capability of the system.

Heat that still succeeds in reaching the unreacted layers of the inner layer will be absorbed by the endothermic reactions characteristic of the process by which this product works until it is all consumed.

Since THERMO-LAG insulation's (inner layer 14) main reactive process is sublimation, the temperature inside this layer will not exceed the sublimation temperature until all of this layer has been consumed, when it is used as inner layer.

When the heat shield is placed on the THERMO-LAG insulation, it will perceive less severe heat fluxes, will last longer, and will therefore increase the fire endurance of that system.

Another important effect of the heat shield is to hold the fragile insulating char produced by THERMO-LAG insulation in place, preventing it from being removed and exposing unreacted layers to heat, by hot drafts or gravity. The heat shield will also prevent cracks that tend to appear on the THERMO-LAG insulation joints from exposing the substrate to heat.

FIG. 4—Heat Shield Main Components—Description

FIG. 4 shows in tranverse cross-section the main components of the arrangement of the present invention. As shown, screen 10 consists of six layers: low-temperature heat-dissipating/physical abuse protecting layer 44, high-temperature heat reflecting layer 45, two high-temperature heat insulating layers 46, high-temperature heat absorbing layer 47, and porous mesh of intumescent material 48. FIG. 4 also shows a spacer coated with a material with high thermal conductivity, heat conducting metallic gauze 42, improved heat conducting contact layer 43, and conducting link 41.

FIG. 5—Cable Tray Multiple Wrapping

FIG. 5 shows in transverse cross-section a cable tray protected against fire by wrapping arount it multiple basic fire shields, one over the other. Greater fire endurance can be achieved by using multiple combinations of the basic arrangement (screen 10, spacer 12, and heat sink inner layer 14) and also combinations of the basic arrangement and its individual components.

FIG. 6A to 6H—Heat Shield Alternative Configurations—Description

Additional embodiments are shown in FIG. 6A to FIG. 6E in decreasing order of fire endurance and increasing order of ampacity.

FIG. 6A Shows a transverse cross-section of electric cables in a tray 22 protected by the arrangement of the present invention. This arrangement provides the highest fire endurance characteristic and the lowest ampacity configuration. Screen 10 containing four main layers: heat-dissipating layer 44, heat-reflecting layer 45, heat-insulating layer 46, and heat-absorbing layer 47.

The arrangement of FIG. 6B does not contain thermal contact layer 43 nor heat absorbing layer 47. This arrangement is a step down in fire protection from the arrangement of FIG. 6A.

FIG. 6C shows an arrangement similar to the arrangement of FIG. 6B except that heat conducting metallic gauze 42 and spacer coated with high conductivity material is added.

FIG. 6D shows a cable tray 22 protected with a screen containing only two layers, heat dissipating layer 44 and heat insulating layer 46.

FIG. 6E provides the lowest fire endurance and the highest ampacity configuration. It shows a screen containing only one layer: heat-dissipating layer 44, and heat sink inner layer 14.

FIG. 6F shows an embodiment that includes intumescent material in the form of bead 60.

FIG. 6G shows an embodiment that includes porous mesh of intumescent material 48, heat conducting mesh 64, and tack 52.

FIG. 6H shows intumescent material in the form of coating 62 that will swell to fill the gap with insulating porous matrix under fire conditions.

Tack 45, conducting gauze 42, thermal contact layer 43, conducting link 41, and conducting mesh 64 are examples of materials that will improve conductive heat dissipation during normal operation.

In one embodiment, screen 10 is composed of the following layers:

a) The topmost layer is a heat-conducting, heat-dissipating, and physical-abuse-protecting layer 44 made from fine mesh metallic wire cloth. This layer also contains the other layers during a hose stream test after a fire test.

b) The next layer is porous heat-reflecting layer 45. Since, at fire condition, about 90 percent of the total heat flux is radiant, layer 45 reflects a good portion of the incoming heat flux away from the protected article. Layer 45 is a perforated foil or a coating of materials from the group of titanium dioxide, magnesium oxide, zirconium oxide, aluminum oxide, and silicon dioxide.

c) The next layer down is a porous heat-insulating layer 46, such as porous ceramic fiber woven cloth, and silicon dioxide woven cloth.

d) The next layer down is a porous heat absorbing layer 47 made from endothermic materials that will react to absorb heat under fire conditions. Examples of such materials are materials that sublime such as THERMO-LAG, release water such as that sold by Carboline of St. Louis Mo. under the trade name of PYROCRETE, and materials that transform heat into light such as thorium or cerium nitrate, neodymium, or praceodymium.

Each of layers a) to d) can be a combination of sublayers instead of a single layer.

There are various possibilities with regard to varying fire endurance and ampacity by adding or removing layers and low temperature heat dissipating features to the basic arrangement.

EXAMPLES

The following examples are illustrative of several variations of the insulating arrangement.

Example I

One layer of high-temperature grade stainless steel wire cloth having a 47×47 per centimeter mesh, with a 0.1 mm (0.0036 inch) wire diameter, readily available from many manufacturers, and one backing layer of ceramic woven cloth, sold under the trademark KAOTEX 2500 by Thermal Ceramics of Augusta, Ga., are placed one next to the other with a layer of silicon dioxide fiber woven cloth, sold under the trademark RE-FRASEAL C100-28 by BP Chemical of Gardena, Calif., and a perforated foil of a metallic material that oxidizes readly under fire conditios to become a heat reflective material, such as foils of aluminum, magnesium, titanium, and zirconium, in between, with the foil next to the stainless steel cloth, to produce a porous screen of about 1.5 mm (0.06 inch) thickness, consisting of a metallic heat conducting outer side, fire side, and a ceramic heat insulating inner side, the side facing the protected elements.

A stainless steel knitted wire mesh of 0.15 mm (0.006 inch) wire diameter crimped to form "V" shaped troughs of 6.35 mm (0.25 inch) depth, such as that sold by ACS Industries of Houston Tex. It acts as a spacer and is attached, with the troughs perpendicular to the folding direction of the resulting mat, to the insulating side of the screen by stainless steel stitches. It establishes a heat conducting link between the spacer and the metallic face of the screen.

The screen-spacer system constructed as such is a light, flexible, and thin blanket that when wrapped in multilayers around conduits or cable trays that have been protected against fire with a 25.4 mm (one inch) thick THERMO-LAG 330 as inner layer heat sink and secured with stainless steel tie wire or bands, will prevent the cables inside the trays or conduits from reaching 177° C. when tested for three hours fire endurance according to the time temperature condition of ASTM E119 Standard, and, during normal operation of the protected electric cables, the cable temperature will not exceed the 90° C. limit when the cables are derrated between 20 and 40%.

Example II

Example II is similar to Example I, except that the screen contains no ceramic cloth backing. It consists of a stainless steel wire cloth only. The other components are the same as Example I. The shield of this example is more favorable than Example I as far as ampacity derrating is concerned, but it is less effective in blocking heat from fire than the shield of Example I.

Example III

Example III is also a variation of Example I, except that multiple layers of ceramic cloth and silicon dioxide cloth are placed as backing instead of one single layer, as in Example I. The shield of Example III is more effective in blocking heat from fire, but is less effective in dissipating low-temperature heat during normal operation.

Example IV

Example IV is the same as Example I or Example III, except that the conducting link between the spacer and screen is made from a heat-sensitive material that will desintegrate at high-temperatures. This feature of Example IV will improve both the ability to dissipate low-temperature heat and to block high temperature heat.

Example V

Example V is a variation of Example IV where a heat conducting gauze made from a high temperature sensitive material is placed in the gap. The shield of Example V is an improvement on Example IV in that the former dissipates low temperature heat better.

Example VI

Example VI is a variation of Examples I through V, where a larger gap is utilized by using a spacer with a thicker three-dimensional matrix, such as that of doubling the spacer of the shield of Example I or utilizing a spacer with deeper troughs.

Example VII

This is the same as Examples I through VI, except that the material of the spacer has been coated with non-sticking coatings, such as that provided by Tiodize of Huntington Beach, Calif. under the trademark TIOLON X20 to provide for a non-stick wire surface to facilitate the expansion of the inner layer through the three-dimensional mesh.

Example VIII

This is the same as any of the Examples I through VII, except that the material of the spacer is tempered to provide a more stable gap.

Example IX

This is the same as Examples I through VIII, except that the inner layer is not THERMO-LAG insulation, but any other material or system used for fire protection of heat producing articles, such as INTERAM insulation or any other endothermic composition, preferably those that liberate gases, such as gases of sublimation.

Example X

This is the same as Examples I or II, except that no metallic wire cloth is used: only ceramic cloth is used to build the screen. The insulator of Example X provides the best high temperature heat blocking, but is most unfavorable as far as ampacity derrating is concerned and does not have physical abuse protection nor hose stream protection.

Example XI

This is the same as any of the previous examples containing metallic wire mesh, except that materials other than stainless steel are used, such as those sold under the trademarks MONEL or INCONEL by The International Nickel Company, Inc., or any other specialized high temperature materials.

Example XII

This is the same as Example I through XI, except that a heat reflecting perforated foil or coating of heat reflecting material, such as titanium dioxide, magnesium dioxide, zirconium dioxide, or aluminum dioxide is added to the screen between the outermost layer and second layer down towards the inside.

Example XIII

This is the same as Example XII, except that a porous foil or coating or thin sheet of heat absorbing material such as any of the endothermic reacting fire protection materials, such as INTERAM insulation, THERMO-LAG insulation and cementitious materials or materials, such as thorium nitrate, cerium nitrate, neodymium, or praceodymium is added between the insulating layer and the reflecting layer.

Example XIV

This is the same as any of the previous examples, except that an intumescent material is placed in the gap as a mesh, a coating, or a bead. Under fire this material will intumesce to fill the gap with insulating char.

CONCLUSIONS, RAMIFICATIONS, AND SCOPE

The reader will thus see that temperature-sensitive, heat-generating articles are well fire protected by the arrangement of the present invention. They will have the ability to withstand exposure to a fire environment, such as that prescribed by test standard ASTM E 119 for more than three hours without the internal average temperature exceeding 163° C. (325° F.) above ambient temperature, and will allow heat dissipation during normal operation in a way that the protected electric cables do not have to be excessively derrated for the internal temperature to stay below the 90° C. limit. Also, the arrangement, when tested for smoke developed, fuel contributed, and flame spread according to test standard ASTM E 84, will result in all indexes below 25. It will also pass a hose stream test after the fire test. In addition the fire protection configuration can be easily applied by staggered wrapping around the articles to be protected against fire and removed without damaging the articles. Furthermore, the fire protection arrangement has the additional advantages in that:

- it permits applications that are a combination of several basic arrangements and combinations of the basic arrangement with components of the basic arrangement.
- it can be used to upgrade existing fire protection systems to improve its fire endurance without excessive ampacity derrating, therefore allowing for the possibility of cheaper and safer electrical circuits.
- it can be used as new installation in which case the inner layer can be designed without much emphasis on organic binders, therefore resulting in a less toxic assemblage under fire.
- the use of a thin screen and a knitted crimped wire mesh as a spacer with the line of the troughs perpendicular to the folding direction allows easy folding without any permanent deformation, thereby allowing removal and reuse of the same system.
- by choosing specialized materials to compose the arrangement, one can build systems for other applications than those mentioned such as protecting articles against fire from jets of fuel, explosions, hydrocarbon fires, etc..

Although the invention has been described with specific references and specific details of embodiments thereof, it is to be understood that it is not intended to be so limited, since changes and alterations therein may be made by those skilled in the art which are within the full intended scope of this invention as defined by the appended claims and their legal equivalents.

I claim:

1. A fire-protection arrangement having a temperature-sensitive, heat-producing article, comprising:
   (a) an inner layer of an active endothermic material heat barrier for enclosing and contacting said temperature-sensitive, heat-producing article,
   (b) a multi-layered, vented, flexible, low-temperature heat-dissipating, high-temperature heat-blocking fire shield enclosing said inner layer, said fire shield comprising:
      (1) a vented heat screen of sheet materials forming an external surface constituting a fire side of said heat screen and an opposite surface constituting an internal side of said heat screen,
      (2) a spacer producing a vented gap between said screen and said inner layer, said spacer comprising a three-dimensional lattice layer, said spacer being located between said heat screen and said inner layer at said internal side of said heat screen, and,
      (3) heat-conductive means for dissipating low-temperature internal heat through said gap and said heat screen to surroundings, said heat conductive means having a plurality of heat-conducting materials forming a heat conducting path for said internal heat between said inner layer and said external surface of said heat screen,
      (4) heat-convective means for dissipating low temperature internal heat through said gap and said heat screen to said surroundings, said heat-convective means comprising venting means for said heat screen for allowing air to circulate, by natural convection, from said surroundings to a surface of said inner layer, through said fire shield and back to said surroundings, and
      (5) heat-emissive means for dissipating low temperature internal heat to said surroundings, said heat emissive means comprising a heat-emissive material forming said external surface of said heat screen.

2. The fire protection arrangement of claim 1 wherein said three dimensional lattice layer comprises a knitted, crimped, high-temperature-resistant wire mesh.

3. The fire protection arrangement of claim 2 wherein said high-temperature-resistant wire mesh is crimped to form a plurality of U-shaped elongated troughs parallel to each other so as to define a plurality of parallel lines.

4. The fire protection arrangement of claim 3 wherein said fire shield enclosing said inner layer is folded along a predetermined folding direction perpendicular to said parallel lines of said troughs for wrapping said fire shield around said inner layer without permanently deforming said three-dimensional lattice layer.

5. The fire protection arrangement of claim 1 wherein part of said heat-conducting path comprises said plurality of heat-conducting materials in said gap.

6. The fire protection arrangement of claim 5 wherein said heat-conducting material is a heat-conducting spacer.

7. The fire protection arrangement of claim 5 wherein said heat-conducting material placed in said gap is a heat-conducting coating on said spacer.

8. The fire protection arrangement of claim 5 wherein said heat-conducting material placed in said gap is a second three-dimensional lattice layer, which, together with said spacer, occupies said gap.

9. The fire protection arrangement of claim 5 wherein said heat-conducting material placed in said gap is a temperature-sensitive material that disintegrates under fire conditions.

10. The fire protection arrangement of claim 5 wherein said heat conducting material placed in said gap is tacked to the surface of said inner layer to improve thermal contact.

11. The fire protection arrangement of claim 5 wherein said inner layer has a coating thereon to improve thermal contact to said heat-conducting material placed in said gap.

12. The fire protection arrangement of claim 1 wherein part of said heat conducting-path is a heat-conducting link connecting said heat-conducting materials placed in said gap to said external surface of said screen.

13. The fire protection arrangement of claim 12 wherein said heat conducting link includes a link selected from the group consisting of stitches, staples, and tacks.

14. The fire protection arrangement of claim 12 wherein said heat-conducting link is a temperature-sensitive link that disintegrates under fire conditions.

15. The fire protection arrangement of claim 14 wherein said temperature-sensitive link is a fusible link that disintegrates under fire conditions.

16. The fire protection arrangement of claim 1, further including, in said gap formed by said spacer, an intumescent material that intumesces under elevated temperature to form an insulating porous cellular matrix that fills said gap under fire conditions.

17. The fire protection arrangement of claim 16 wherein said intumescent material placed in said gap is in the form of beads.

18. The fire protection arrangement of claim 16 wherein said intumescent material placed in said gap is a porous mesh placed adjacent to said heat screen.

19. The fire protection arrangement of claim 16 wherein said intumescent material placed in said gap is a coating on a layer occupying said gap.

20. The fire protection arrangement of claim 16 wherein said intumescent material placed in said gap is a coating on a layer of said heat screen adjacent to said gap.

21. The fire protection arrangement of claim 1 wherein said multilayered fire shield comprises said vented heat screen having a single vented layer overlaying said three dimensional lattice layer spacer.

22. The fire protection arrangement of claim 21 wherein said single vented layer is a heat insulating layer.

23. The fire protection arrangement of claim 22 wherein said single vented layer comprises a plurality of high-temperature woven fiber cloths.

24. The fire protection arrangement of claim 21 wherein said single vented layer is a heat-conducting and heat-dissipating layer.

25. The fire protection arrangement of claim 24 wherein said heat-conducting and heat-dissipating layer includes a high-temperature, fine-mesh metallic wire cloth.

26. The fire protection of claim 1, further comprising a plurality of said fire shields enclosing said inner layer.

27. The fire protection arrangement of claim 1 wherein said heat-producing article comprises a plurality of electric cables.

28. The fire protection arrangement of claim 27 wherein said heat-producing article comprises a conduit enclosing said electric cables.

29. The fire protection arrangement of claim 27 wherein said heat-producing article comprises a tray enclosing said electric cables.

30. The fire protection arrangement of claim 27 wherein said heat-producing article comprises an instrument panel enclosing said electric cables.

31. The fire protection arrangement of claim 27 wherein said heat-producing article comprises a junction box enclosing said electric cables.

32. The fire protection arrangement of claim 1 wherein said heat screen comprises a plurality of porous layers consisting of a tough, physical-abuse-resistant heat-dissipating heat-conducting layer, a heat-reflecting layer, a heat-insulating layer, and a heat-absorbing layer.

33. The fire protection arrangement of claim 32 wherein said tough physical-abuse-resistant, heat-dissipating, and heat- conducting layer is a high-temperature fine mesh metallic wire cloth; said insulating layer is a high-temperature fiber woven cloth; said heat-absorbing layer is an endothermic reactive material; and said heat-reflecting layer is a high-temperature, heat-reflecting perforated foil.

34. The fire protection arrangement of claim 32 wherein said tough physical-abuse-resistant, heat-dissipating, and heat-conducting layer forms said external surface of said fire shield.

35. The fire protection arrangement of claim 1 wherein said endothermic material heat barrier is made from a material that intumesces and sublimes at elevated temperatures.

* * * * *